US008073068B2

(12) United States Patent  (10) Patent No.: US 8,073,068 B2
Kim et al.  (45) Date of Patent: Dec. 6, 2011

(54) SELECTIVE VIRTUAL ANTENNA TRANSMISSION

(75) Inventors: Byoung-Hoon Kim, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 878 days.

(21) Appl. No.: 11/377,458

(22) Filed: Mar. 15, 2006

(65) Prior Publication Data

US 2007/0041464 A1  Feb. 22, 2007

Related U.S. Application Data

(60) Provisional application No. 60/710,371, filed on Aug. 22, 2005, provisional application No. 60/711,144, filed on Aug. 24, 2005.

(51) Int. Cl.
    *H04B 7/06* (2006.01)
(52) U.S. Cl. ........................................ 375/267
(58) Field of Classification Search .................. 375/132, 375/133, 136, 137, 141, 146–148, 260, 267, 375/299, 347; 455/500, 69, 101
    See application file for complete search history.

(56) References Cited

U.S. PATENT DOCUMENTS

| 5,852,630 A | 12/1998 | Langberg et al. |
| 6,000,054 A | 12/1999 | Bahr et al. |
| 6,084,919 A | 7/2000 | Kleider et al. |
| 6,542,485 B1 | 4/2003 | Mujtaba |
| 6,802,035 B2 | 10/2004 | Catreux et al. |
| 6,888,809 B1 | 5/2005 | Foschini et al. |
| 6,907,269 B2 | 6/2005 | Yamaguchi et al. |
| 6,970,682 B2 | 11/2005 | Crilly, Jr. et al. |
| 7,020,446 B2 | 3/2006 | Mehta et al. |
| 7,103,384 B2 | 9/2006 | Chun |
| 7,184,713 B2 | 2/2007 | Kadous et al. |
| 7,248,841 B2 | 7/2007 | Agee et al. |

(Continued)

FOREIGN PATENT DOCUMENTS

CA  2400517  4/2003

(Continued)

OTHER PUBLICATIONS

MUI, "Successive interference cancellation for cdma2000 using a software defined radio," IEEE Wireless Communications and Networking Conference, 2006, vol. 3, pp. 1591-1596.

(Continued)

*Primary Examiner* — Young T. Tse
(74) *Attorney, Agent, or Firm* — Dmitry R. Milikovsky; Kenyon S. Jenckes

(57) ABSTRACT

Techniques for transmitting data from virtual antennas instead of physical antennas are described. Each virtual antenna may be mapped to some or all physical antennas by a different mapping. The performance of different sets of at least one virtual antenna is evaluated based on one or more metrics such as signal quality, throughput, overall rate, and so on. The virtual antenna set with the best performance is selected for use. If the virtual antenna selection is performed by the receiver, then channel state information for the selected virtual antenna set may be sent to the transmitter. The channel state information may convey the selected virtual antenna(s), the signal quality or rate(s) for the selected virtual antenna(s), one or more preceding matrices used to form the selected virtual antenna(s), and so on. The transmitter and/or receiver use the selected virtual antenna(s) for data transmission.

42 Claims, 7 Drawing Sheets

U.S. PATENT DOCUMENTS

| | | | |
|---|---|---|---|
| 7,260,366 B2 | 8/2007 | Lee et al. | |
| 7,280,622 B2 | 10/2007 | Love et al. | |
| 7,321,563 B2 | 1/2008 | Kim et al. | |
| 7,412,212 B2 | 8/2008 | Hottinen | |
| 7,508,880 B2 * | 3/2009 | Yun et al. | 375/267 |
| 7,711,330 B2 | 5/2010 | Yang et al. | |
| 2002/0122381 A1 * | 9/2002 | Wu et al. | 370/208 |
| 2003/0137955 A1 | 7/2003 | Kim et al. | |
| 2003/0235255 A1 | 12/2003 | Ketchum et al. | |
| 2004/0120411 A1 | 6/2004 | Walton et al. | |
| 2004/0136349 A1 | 7/2004 | Walton et al. | |
| 2004/0190640 A1 * | 9/2004 | Dubuc et al. | 375/260 |
| 2004/0203347 A1 | 10/2004 | Nguyen | |
| 2004/0267778 A1 | 12/2004 | Rudolph et al. | |
| 2005/0009476 A1 | 1/2005 | Wu et al. | |
| 2005/0031044 A1 | 2/2005 | Gesbert et al. | |
| 2005/0047517 A1 | 3/2005 | Georgios et al. | |
| 2005/0052991 A1 * | 3/2005 | Kadous | 370/216 |
| 2005/0128983 A1 | 6/2005 | Kim et al. | |
| 2005/0135499 A1 | 6/2005 | Nam et al. | |
| 2005/0157807 A1 * | 7/2005 | Shim et al. | 375/267 |
| 2005/0220211 A1 | 10/2005 | Shim et al. | |
| 2005/0276347 A1 | 12/2005 | Mujtaba et al. | |
| 2006/0023745 A1 | 2/2006 | Koo et al. | |
| 2006/0050770 A1 * | 3/2006 | Wallace et al. | 375/144 |
| 2006/0067421 A1 * | 3/2006 | Walton et al. | 375/267 |
| 2006/0093062 A1 | 5/2006 | Yun et al. | |
| 2006/0104382 A1 | 5/2006 | Yang et al. | |
| 2006/0111054 A1 * | 5/2006 | Pan et al. | 455/101 |
| 2006/0115014 A1 | 6/2006 | Jeong et al. | |
| 2006/0209980 A1 | 9/2006 | Kim et al. | |
| 2006/0286974 A1 | 12/2006 | Gore et al. | |
| 2007/0041457 A1 * | 2/2007 | Kadous et al. | 375/260 |
| 2008/0080641 A1 | 4/2008 | Kim | |
| 2008/0209115 A1 | 8/2008 | Maeda et al. | |

FOREIGN PATENT DOCUMENTS

| | | |
|---|---|---|
| EP | 1 376 920 | 1/2004 |
| EP | 1655874 | 5/2006 |
| JP | 2002217752 | 8/2002 |
| JP | 2004320434 | 11/2004 |
| JP | 2005509359 | 4/2005 |
| JP | 2005223450 | 8/2005 |
| JP | 20050535167 | 11/2005 |
| JP | 2006520109 | 8/2006 |
| JP | 2007509534 | 4/2007 |
| JP | 2007512760 | 5/2007 |
| JP | 2008521353 | 6/2008 |
| JP | 2008526122 | 7/2008 |
| KR | 20030062135 A | 7/2003 |
| KR | 20040073551 | 8/2004 |
| KR | 20050015731 | 2/2005 |
| RU | 2208911 | 7/2003 |
| RU | 2257609 | 7/2005 |
| RU | 2264010 | 11/2005 |
| TW | I230525 | 3/2002 |
| TW | 200503558 | 1/2005 |
| TW | I231666 | 4/2005 |
| WO | WO0001362 A1 | 1/2000 |
| WO | WO2004019447 | 3/2004 |
| WO | WO2004107693 | 12/2004 |
| WO | 2005109717 | 11/2005 |
| WO | WO2005107125 | 11/2005 |
| WO | WO2006028204 A1 | 3/2006 |
| WO | WO2006030867 | 3/2006 |
| WO | WO2006059566 | 6/2006 |
| WO | 2007024913 | 3/2007 |
| WO | 2008050996 | 5/2008 |
| WO | 2008058112 | 5/2008 |

OTHER PUBLICATIONS

3GPP TSG RAN WG1 #42; "MIMO OFDMA Techniques for Downlink E-UTRA," 3GPP, R1-050724, pp. 1-6, Texas Instruments, London, UK, Aug. 29-Sep. 2, 2005.

3GPP TSG RAN WG1 #46; "Performance of per group rate control (PGRC) with advanced MIMO Receiver," 3GPP, R1-062015, pp. 1-6, Texas Instruments, Tallinn, Estonia, Aug. 28-Sep. 1, 2006.

3GPP TS 36.211 v0.0.0; "3rd Generation Partnership Project; Technical Specification Group Radio Access Network; Evolved UMTS Terrestrial Radio Access; Physical Channels and Modulation (Release x)," 3GPP Technical Specification, Sep. 2006.

3GPP2 C.S0084-001-0 v1.0; "3rd Generation Partnership Project 2; Physical Layer for Ultra Mobile Broadband (UMB) Air Interface Specification," 3GPP2 C.S0084-001-0 version 1.0, Apr. 5, 2007.

Written Opinion—PCT/US2006/032860, International Search Authority—European Patent Office, Dec. 29, 2006.

International Preliminary Report on Patentability—PCT/US2006/032860, International Bureau of WIPO—Geneva, Switzerland—Feb. 26, 2008.

International Search Report—PCT/US06/032860, International Search Authority—European Patent Office, Dec. 29, 2006.

Andreas et al., "MIMO systems with antenna selection," IEEE Microwave Magazine, URL: http://ieee/org/iel5/6668/28677/01284943/pdf, Retrieved on Dec. 8, 2006, pp. 36-56 (2004).

Knopp R et al: "Power control schemes for TDD systems with multiple transmit and receive antennas" Global Telecommunications Conference—GLOBECDM '99, 1999, pp. 2326-2330, XP010373369 * the whole document *.

Kousa M A et al: "Multichannel Adaptive System" IEE Proceedings I. Solid- State & Electron Devices, Institution of Electrical Engineers. Stevenage, GB, vol. 140, No. 5, Part 1, Oct. 1, 1993, pp. 357-364, XP000403498 ISSN: 0956-3776 * the whole document.

Taiwanese Search Report—095130918—TIPO—Apr. 19, 2010 (050947).

* cited by examiner

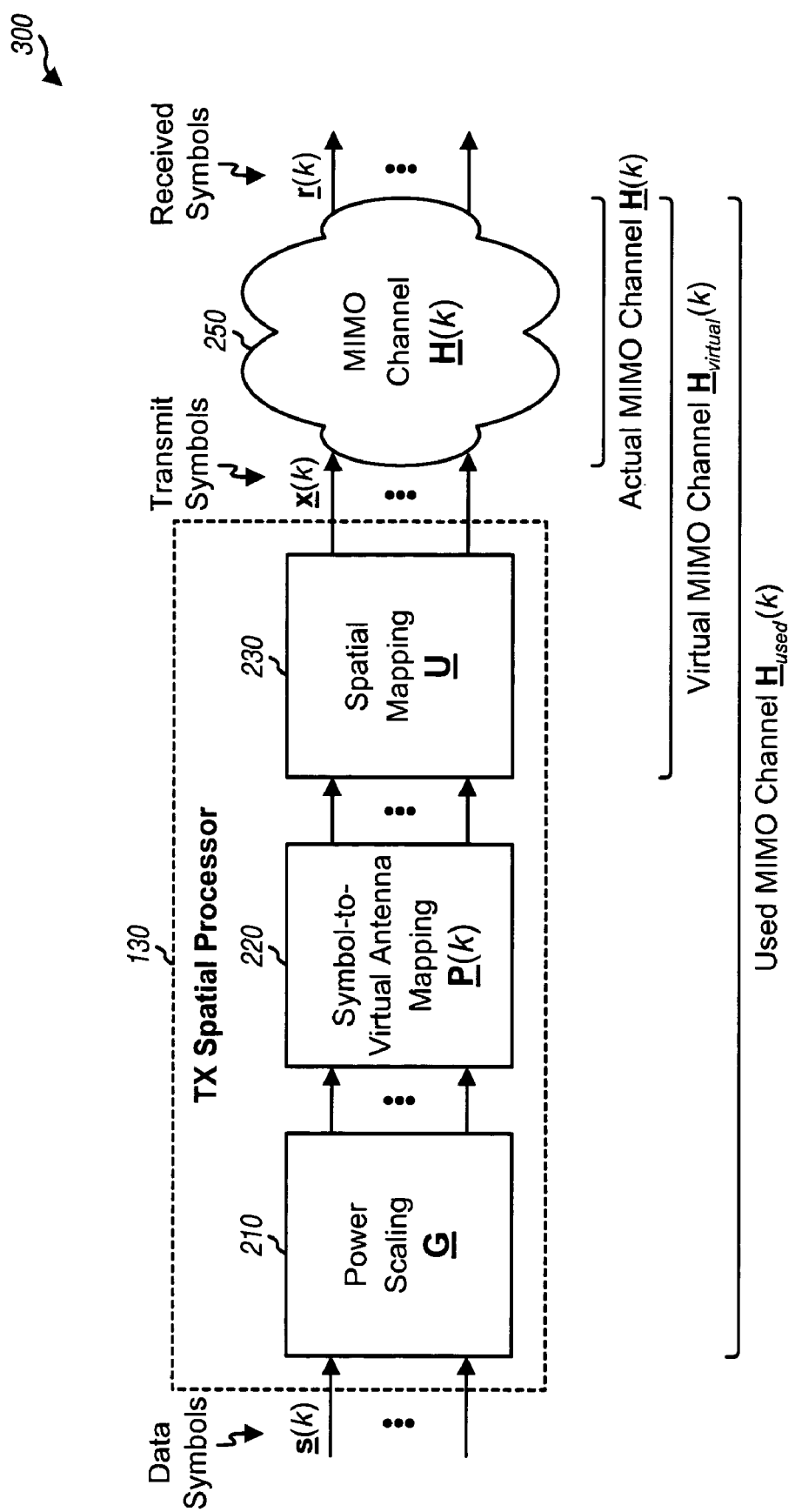

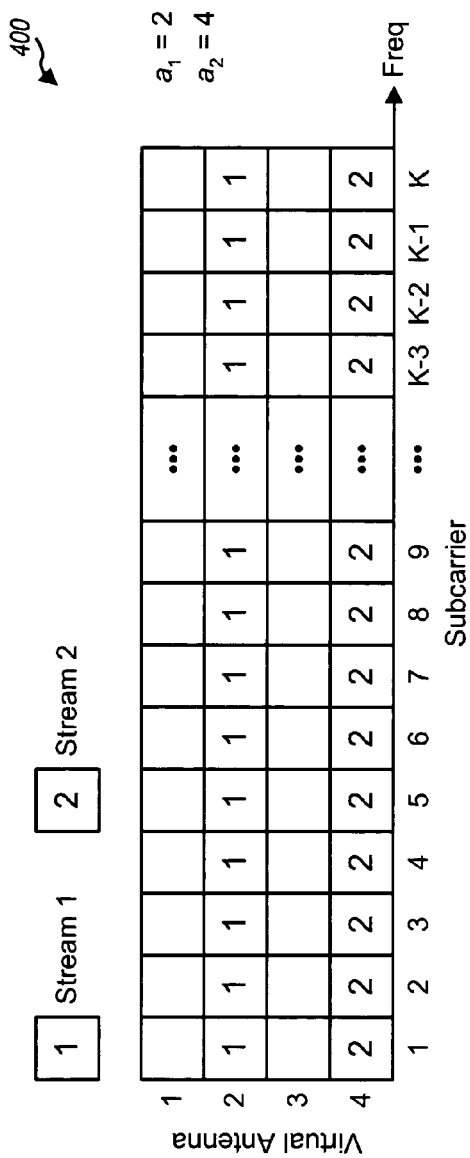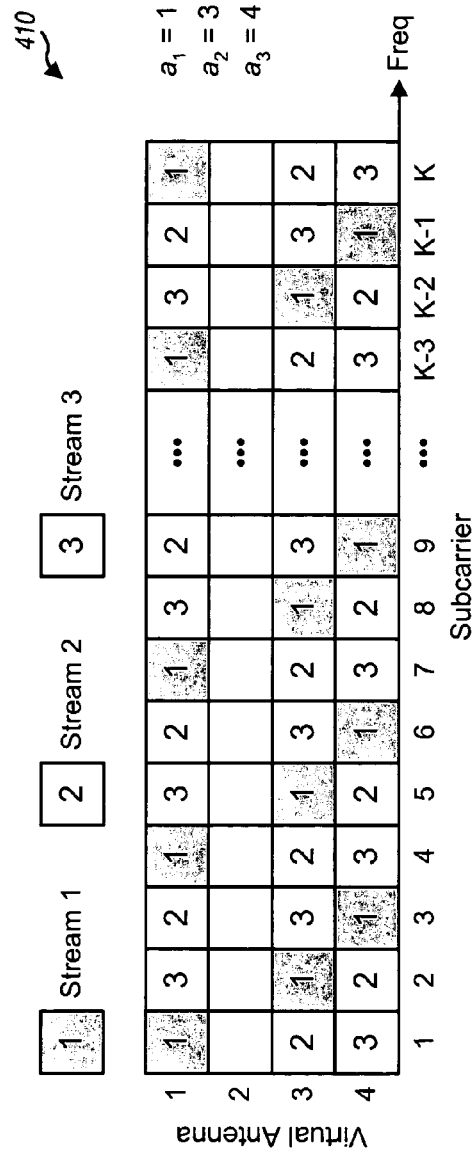

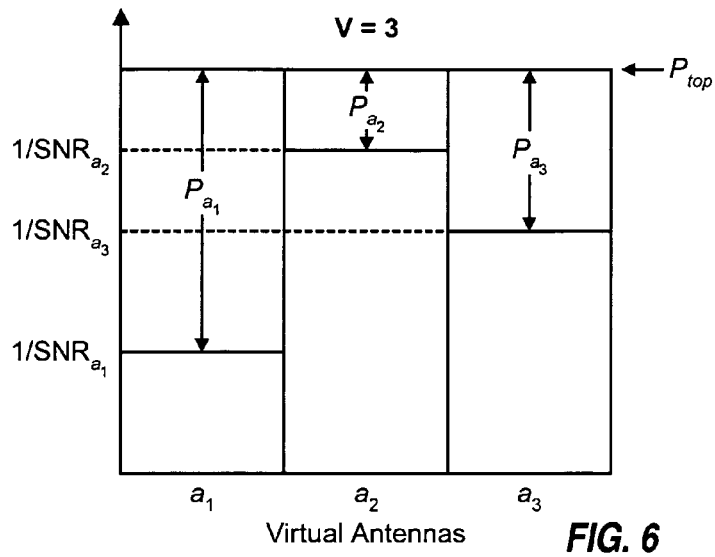
FIG. 6
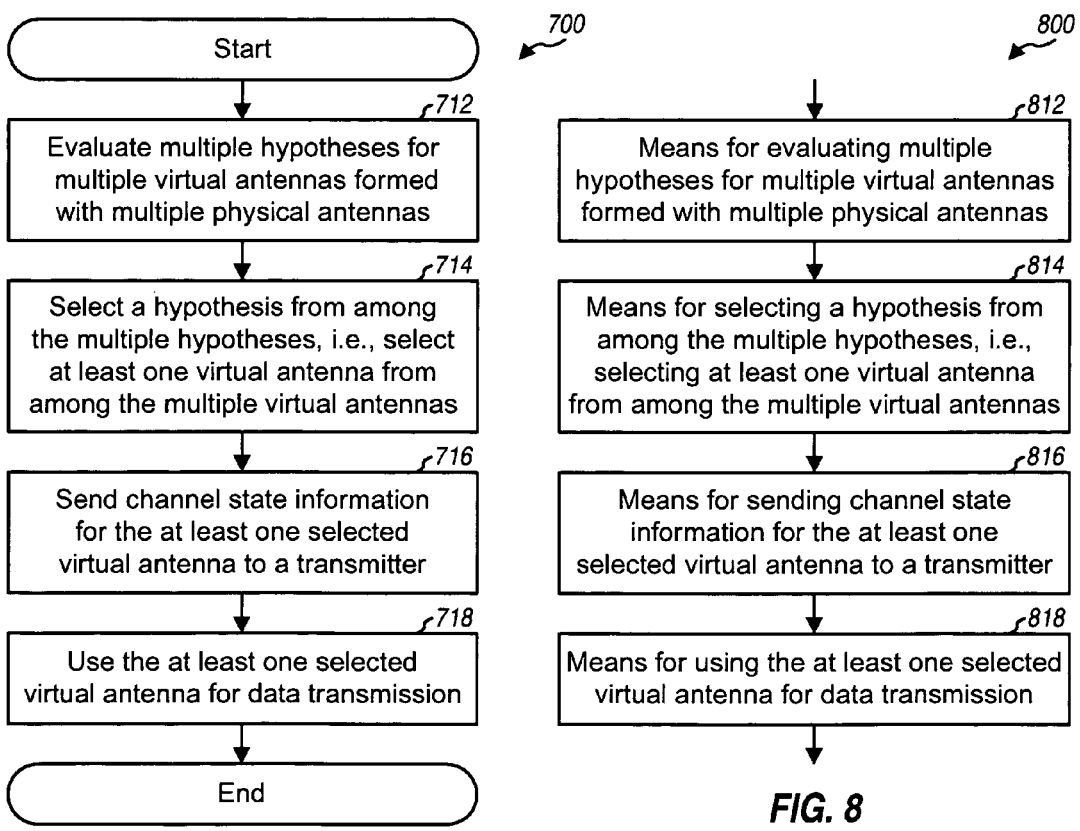
FIG. 7
FIG. 8

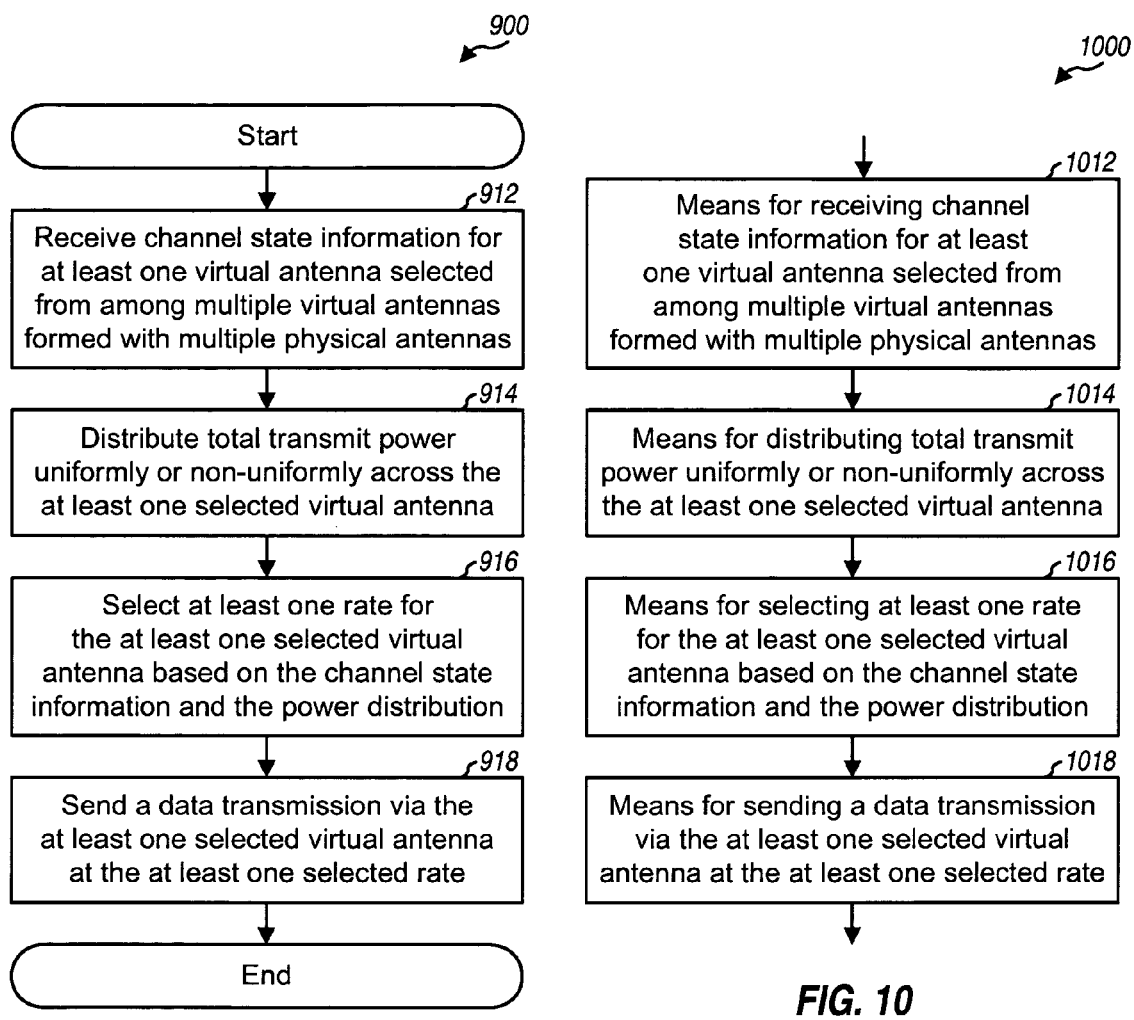

SELECTIVE VIRTUAL ANTENNA TRANSMISSION

CLAIM OF PRIORITY UNDER 35 U.S.C. §119

The present application claims priority to provisional U.S. application Ser. No. 60/710,371, entitled "A METHOD OF SELECTIVE-PSEUDO RANDOM VIRTUAL ANTENNA PERMUTATION," filed Aug. 22, 2005, and Ser. No. 60/711,144, entitled "METHOD AND APPARATUS FOR ANTENNA DIVERSITY IN MULTI-INPUT MULTI-OUTPUT COMMUNICATION SYSTEMS", filed Aug. 24, 2005, and U.S. application Ser. No. 11/261,823, entitled "METHOD AND APPARATUS FOR PROVIDING ANTENNA DIVERSITY IN A WIRELESS COMMUNICATION SYSTEM," filed Oct. 27, 2005, and assigned to the assignee hereof and incorporated herein by reference.

BACKGROUND

I. Field

The present disclosure relates generally to communication, and more specifically to techniques for transmitting data in a wireless communication system.

II. Background

In a wireless communication system, a transmitter (e.g., a base station or a terminal) may utilize multiple (T) transmit antennas for data transmission to a receiver equipped with multiple (R) receive antennas. The multiple transmit and receive antennas may be used to increase throughput and/or improve reliability. For example, the transmitter may transmit T symbols simultaneously from the T transmit antennas to improve throughput. Alternatively, the transmitter may transmit the same symbol redundantly from all T transmit antennas to improve reception by the receiver.

The transmission from each transmit antenna causes interference to the transmissions from the other transmit antennas. In some instances, improved performance may be achieved by transmitting fewer than T symbols simultaneously from the T transmit antennas. This may be achieved by selecting a subset of the T transmit antennas and transmitting fewer than T symbols from the selected subset of transmit antenna(s). The transmit antenna(s) that are not used for transmission do not cause interference to the transmit antenna(s) that are used for transmission. Hence, improved performance may be achieved for the selected subset of transmit antenna(s).

Each transmit antenna is typically associated with certain peak transmit power that may be used for that antenna. The peak transmit power may be determined by a power amplifier used for the transmit antenna, regulatory constraints, and/or other factors. For each transmit antenna that is not used for transmission, the transmit power for that antenna is essentially wasted.

There is therefore a need in the art for techniques to more effectively utilize the transmit power available for the transmit antennas.

SUMMARY

Techniques for transmitting data from virtual antennas instead of physical antennas are described herein. A physical antenna is an antenna used to radiate a signal. A physical antenna typically has a limited maximum transmit power, which is often determined by an associated power amplifier. A virtual antenna is an antenna from which data may be sent. A virtual antenna may correspond to a beam formed by combining multiple physical antennas through a vector of coefficients or weights. Multiple virtual antennas may be formed with multiple physical antennas such that each virtual antenna is mapped to some or all physical antennas by a different mapping, as described below. The virtual antennas enable efficient use of the available transmit power of the physical antennas.

In an aspect, the performance of different sets of at least one virtual antenna is evaluated, and the set of virtual antenna(s) with the best performance is selected for use. Performance may be quantified by various metrics such as signal quality, throughput, overall rate, and so on. In an embodiment, multiple hypotheses are evaluated based on at least one metric. Each hypothesis corresponds to a different set of at least one virtual antenna. The hypothesis with the best performance (e.g., the highest signal quality, throughput, or overall rate) is selected from among all of the hypotheses evaluated. If the virtual antenna selection is performed by the receiver, then channel state information for the selected virtual antenna(s) may be sent to the transmitter. The channel state information may convey various types of information such as the selected virtual antenna(s), the signal quality or rate(s) for the selected virtual antenna(s), one or more matrices used to form the selected virtual antenna(s), and so on. The transmitter and/or receiver may use the selected virtual antenna(s) for data transmission.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 3 shows a transmission model for virtual antennas.

FIGS. 4A and 4B show two exemplary transmissions from virtual antennas.

FIG. 6 shows an example of water-filling power distribution.

FIG. 7 shows a process to select and use virtual antennas.

FIG. 8 shows an apparatus to select and use virtual antennas.

FIG. 9 shows a process to transmit data from virtual antennas.

FIG. 10 shows an apparatus to transmit data from virtual antennas.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
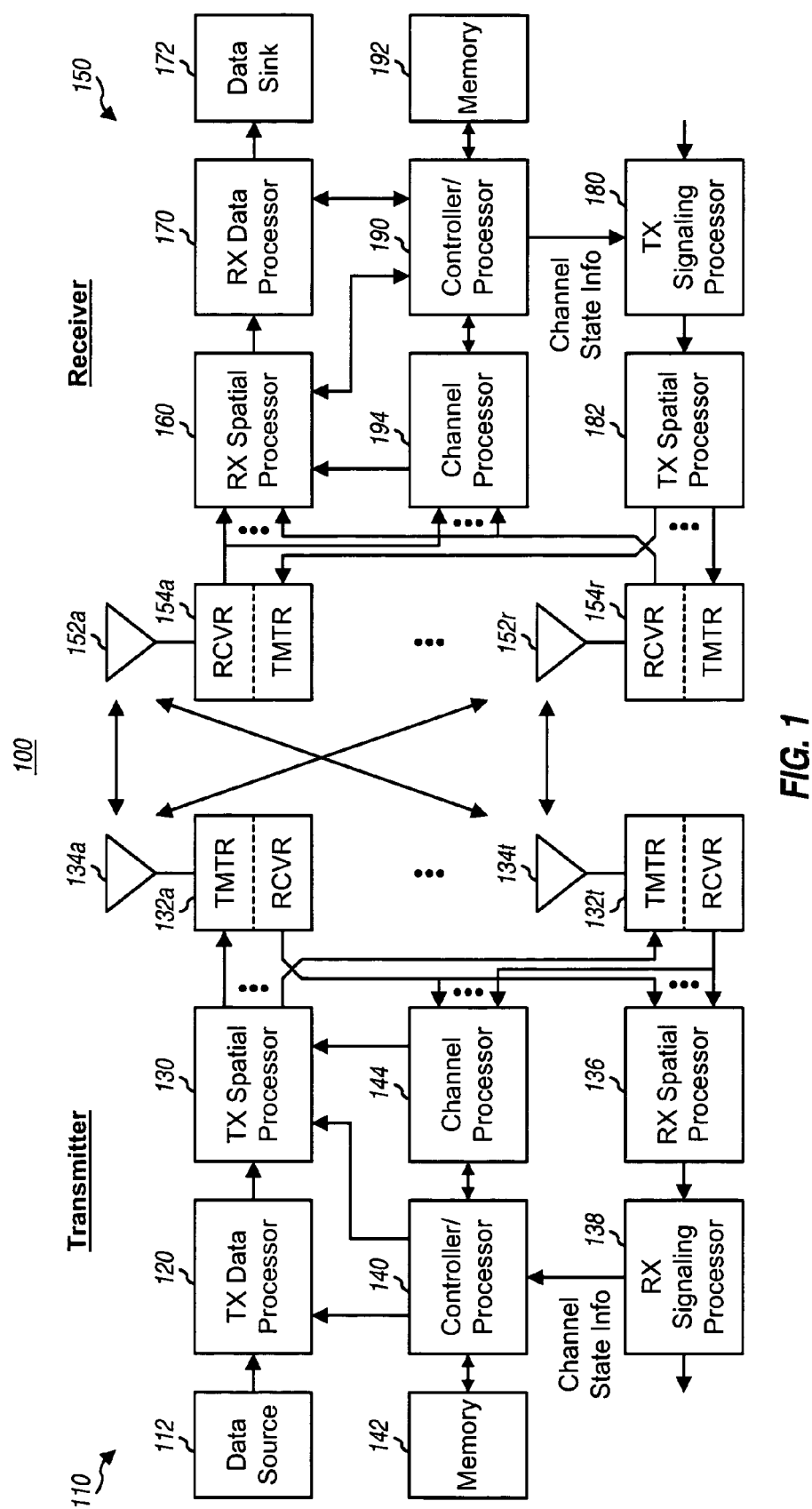
FIG. 1 shows a block diagram of a transmitter and a receiver.

FIG. 1 shows a block diagram of an embodiment of a transmitter 110 and a receiver 150 in a communication system 100. Transmitter 110 is equipped with multiple (T) antennas, and receiver 150 is equipped with multiple (R) antennas. Each transmit antenna and each receive antenna may be a physical antenna or an antenna array. For downlink (or forward link)

transmission, transmitter 110 may be part of, and may contain some or all of the functionality of, a base station, an access point, a Node B, and/or some other network entity. Receiver 150 may be part of, and may contain some or all of the functionality of, a mobile station, a user terminal, a user equipment, and/or some other device. For uplink (or reverse link) transmission, transmitter 110 may be part of a mobile station, a user terminal, a user equipment, and so on, and receiver 150 may be part of a base station, an access point, a Node B, and so on.

At transmitter 110, a TX data processor 120 receives traffic data from a data source 112 and processes (e.g., formats, encodes, interleaves, and symbol maps) the traffic data to generate data symbols. As used herein, a data symbol is a modulation symbol for data, a pilot symbol is a modulation symbol for pilot, a modulation symbol is a complex value for a point in a signal constellation (e.g., for M-PSK or M-QAM), and a symbol is typically a complex value. Pilot is data that is known a priori by both the transmitter and the receiver and may also be referred to as training, reference, preamble, and so on. A TX spatial processor 130 multiplexes the data symbols with pilot symbols, performs spatial processing on the multiplexed data and pilot symbols, and provides T streams of transmit symbols to T transmitter units (TMTR) 132a through 132t. Each transmitter unit 132 processes (e.g., modulates, converts to analog, filters, amplifies, and upconverts) its transmit symbol stream and generates a modulated signal. T modulated signals from transmitter units 132a through 132t are transmitted from antennas 134a through 134t, respectively.

At receiver 150, R antennas 152a through 152r receive the T modulated signals, and each antenna 152 provides a received signal to a respective receiver unit (RCVR) 154. Each receiver unit 154 processes its received signal in a manner complementary to the processing performed by transmitter units 132 to obtain received symbols, provides received symbols for traffic data to a receive (RX) spatial processor 160, and provides received symbols for pilot to a channel processor 194. Channel processor 194 estimates the response of the multiple-input multiple-output (MIMO) channel from transmitter 110 to receiver 150 based on the received symbols for pilot (and possibly the received symbols for traffic data) and provides channel estimates to RX spatial processor 160. RX spatial processor 160 performs detection on the received symbols for traffic data with the channel estimates and provides data symbol estimates. An RX data processor 170 further processes (e.g., deinterleaves and decodes) the data symbol estimates and provides decoded data to a data sink 172.

Receiver 150 may evaluate the channel conditions and may send channel state information to transmitter 110. The channel state information may indicate, e.g., a specific set of at least one virtual antenna to use for transmission, one or more matrices used to form the selected virtual antenna(s), one or more rates or packet formats to use for transmission, signal quality for the selected virtual antenna(s), acknowledgments (ACKs) and/or negative acknowledgments (NAKs) for packets decoded by receiver 150, other types of information, or any combination thereof. The channel state information is processed (e.g., encoded, interleaved, and symbol mapped) by a TX signaling processor 180, spatially processed by a TX spatial processor 182, and further processed by transmitter units 154a through 154r to generate R modulated signals, which are transmitted via antennas 152a through 152r.

At transmitter 110, the R modulated signals are received by antennas 134a through 134t, processed by receiver units 132a through 132t, spatially processed by an RX spatial processor 136, and further processed (e.g., deinterleaved and decoded) by an RX signaling processor 138 to recover the channel state information. A controller/processor 140 controls the data transmission to receiver 150 based on the channel state information. A channel processor 144 may estimate the response of the MIMO channel from receiver 150 to transmitter 110 and may provide pertinent information used for data transmission to receiver 150.

Controllers/processors 140 and 190 control the operation at transmitter 110 and receiver 150, respectively. Memories 142 and 192 store data and program codes for transmitter 110 and receiver 150, respectively.

The techniques described herein may be used for various wireless communication systems such as a Frequency Division Multiple Access (FDMA) system, a Code Division Multiple Access (CDMA) system, a Time Division Multiple Access (TDMA) system, a Spatial Division Multiple Access (SDMA) system, an Orthogonal FDMA (OFDMA) system, a Single-Carrier FDMA (SC-FDMA) system, and so on. An OFDMA system utilizes Orthogonal Frequency Division Multiplexing (OFDM). OFDM and SC-FDMA partition the overall system bandwidth into multiple (K) orthogonal subcarriers, which are also called tones, bins, and so on. Each subcarrier may be modulated with data. In general, modulation symbols are sent in the frequency domain with OFDM and in the time domain with SC-FDMA.

1. Transmitter Processing

The transmitter may transmit one or more output symbols simultaneously from the T transmit antennas on each subcarrier in each symbol period. Each output symbol may be a modulation symbol for OFDM, a frequency-domain symbol for SC-FDMA, or some other complex value. The transmitter may transmit the output symbols using various transmission schemes.

In an embodiment, the transmitter processes the output symbols for transmission, as follows:

$$x(k)=U \cdot P(k) \cdot G \cdot s(k), \qquad \text{Eq (1)}$$

where $s(k)=[s_1(k)\ s_2(k) \ldots s_V(k)]^T$ is a V×1 vector containing V output symbols to be sent on subcarrier k in one symbol period, G is a V×V diagonal matrix containing the gains for the V output symbols, P(k) is a T×V permutation matrix for subcarrier k, $U=[u_1\ u_2 \ldots u_T]$ is a T×T orthonormal matrix, $x(k)=[x_1(k)\ x_2(k) \ldots x_T(k)]^T$ is a T×1 vector containing T transmit symbols to be sent from the T transmit antennas on subcarrier k in one symbol period, and "$^T$" denotes a transpose.

For simplicity, the description herein assumes that the average power of each element $s_i(k)$ in vector s(k) is unity. Equation (1) is for one subcarrier k. The transmitter may perform the same processing for each subcarrier used for transmission.

T is the number of transmit antennas. T is also the number of virtual antennas available for use and formed with T columns $u_1$ through $u_T$ of the orthonormal matrix U. The virtual antennas may also be called effective antennas or by some other terminology. V is the number of output symbols being sent simultaneously on one subcarrier in one symbol period. V is also the number of virtual antennas used for transmission. In general, $1 \leq V \leq \min\{T, R\}$. V may be a configurable parameter that may be selected as described below.

Although not shown in equation (1), the transmitter may employ cyclic delay diversity to improve frequency selectivity of the virtual antennas. Cyclic delay diversity may be implemented (1) in the frequency domain by applying a different phase ramp across the K subcarriers of each transmit antenna or (2) in the time domain by applying T different cyclic delays for the T transmit antennas. For simplicity, the description below is for the embodiment shown in equation (1) without cyclic delay diversity.

In equation (1), the gain matrix G determines the amount of transmit power to use for each of the V output symbols being sent simultaneously. In an embodiment, the gain matrix is defined such that the total transmit power $P_{total}$ for the T transmit antennas is used for transmission regardless of the number of output symbols being sent, i.e., regardless of the value of V. In an embodiment, the total transmit power is uniformly or evenly distributed across the V output symbols, and the gain matrix may be defined as:

$$G = \sqrt{\frac{T}{V} \cdot \frac{P_{tx}}{K}} \cdot I, \qquad \text{Eq (2)}$$

where I is the identity matrix and $P_{tx}$ is the maximum transmit power for each transmit antenna. Equation (2) assumes that all K subcarriers are used for transmission. In this embodiment, higher transmit power may be used for each output symbol if fewer output symbols are being sent. In other embodiments, the total transmit power may be non-uniformly or unevenly distributed across the V output symbols.

The permutation matrix P(k) selects V specific virtual antennas (or V specific columns of U) to use for subcarrier k from among the T available virtual antennas. The permutation matrix may be defined in various manners, as described below. The same or different permutation matrices may be used for the K subcarriers.

The orthonormal matrix U is characterized by the property $U^H \cdot U = I$, where $U^H$ is the conjugate transpose of U. The T columns of U are orthogonal to one another, and each column has unit power. In an embodiment, U is defined such that the sum of the squared magnitude of the T entries in each row is equal to a constant value. This property results in equal transmit power being used for all T transmit antennas. U may also be a unitary matrix that is characterized by the property $U^H \cdot U = U \cdot U^H = I$.

Various orthonormal and unitary matrices may be used to form the virtual antennas. In an embodiment, a T×T Walsh/Hadamard matrix W is used for U. In another embodiment, a T×T Fourier matrix F is used for U. In yet another embodiment, U is formed as $U = \Lambda \cdot F$, where $\Lambda$ is a diagonal matrix containing T scaling values for the T rows of F. For example, $\Lambda$ may be defined as $\Lambda = \text{diag} \{1 \; e^{j\theta_1} \ldots e^{j\theta_{T-1}}\}$, where $\theta_t$ for $t = 1, \ldots, T-1$ may be random phases that change the spatial directions depicted by the columns of F. In yet another embodiment, U is an orthonormal matrix with pseudo-random elements. Various other matrices may also be used for U.

In an embodiment, a single orthonormal matrix U is used for all K subcarriers in all symbol periods. In this embodiment, U is not a function of subcarrier index k or symbol index n. In another embodiment, different orthonormal matrices are used for different subcarriers. In yet another embodiment, different orthonormal matrices are used for different sets of subcarriers that may be assigned to different users. In yet another embodiment, different orthonormal matrices are used for different time intervals, where each time interval may span one or multiple symbol periods. In yet another embodiment, one or more orthonormal matrices are selected for use from among a set of orthonormal matrices available for use. In general, data and pilot may be transmitted using one or more orthonormal matrices such that the receiver is able to estimate the channel response based on the pilot and use the channel estimate to recover the data sent to the receiver.

An orthonormal matrix (e.g., a Walsh/Hadamard matrix or a Fourier matrix) may be selected for use without knowledge of the MIMO channel response. An orthonormal matrix may also be selected based on knowledge of the MIMO channel response and may then be referred to as a precoding matrix. The precoding matrix may be selected by the receiver and indicated to the transmitter or may be selected by the transmitter in a TDD communication system.

Figure 2:
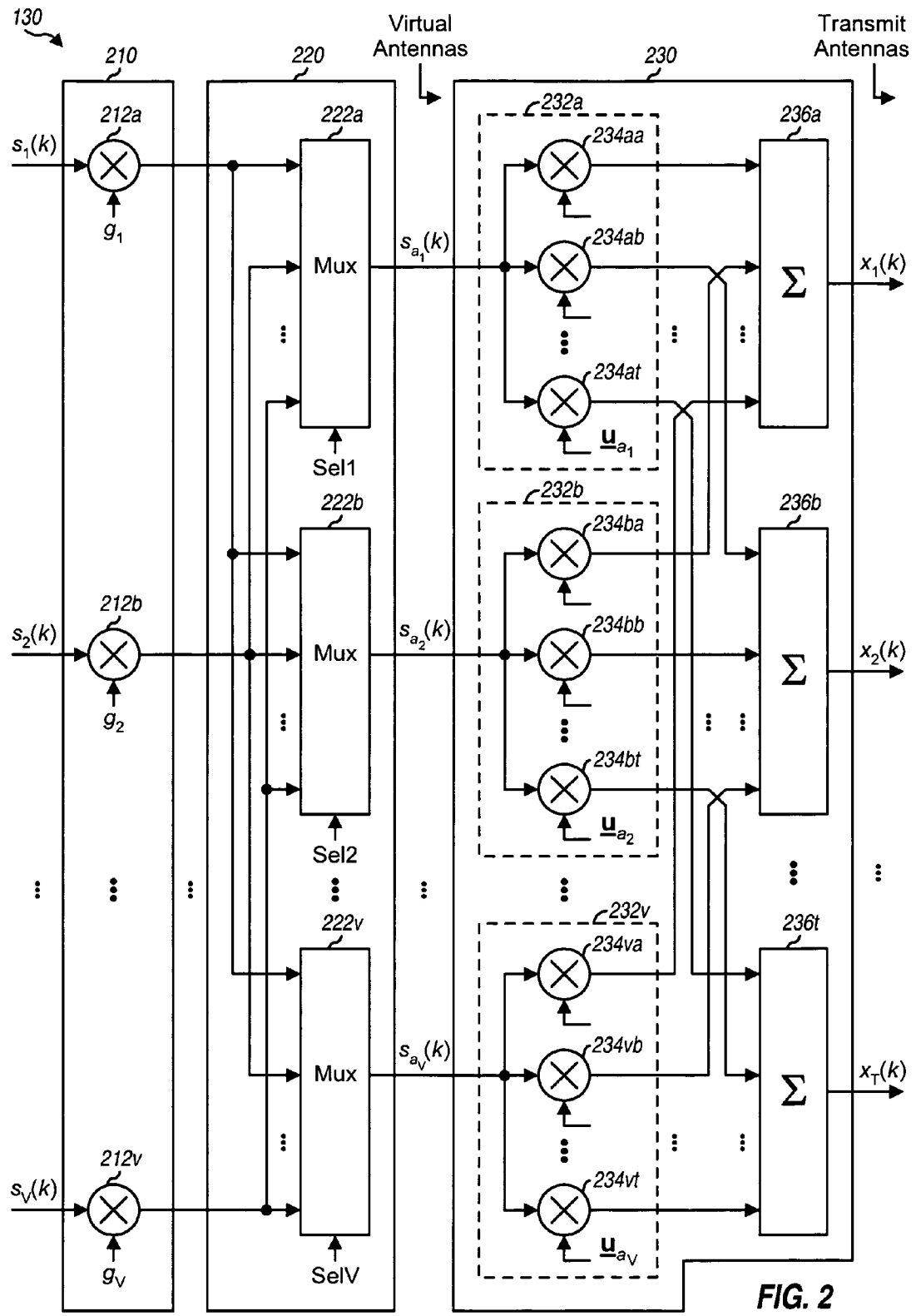
FIG. 2 shows a block diagram of a transmit (TX) spatial processor.

FIG. 2 shows an embodiment of TX spatial processor 130, which performs the processing shown in equation (1). TX spatial processor 130 includes a power scaling unit 210, a symbol-to-virtual antenna mapping unit 220, and a spatial mapping unit 230. Within unit 210, V multipliers 212a through 212v receive V output symbols $s_1(k)$ through $s_v(k)$, respectively, in vector s(k), multiply these output symbols with gains $g_1$ through $g_v$, respectively, in gain matrix G, and provide V scaled symbols. Multipliers 212a through 212v perform the matrix multiplication G·s(k).

In the embodiment shown in FIG. 2, each scaled symbol is mapped to one virtual antenna by unit 220. V virtual antennas $a_1$ through $a_v$ are selected for use from among T available virtual antennas 1 through T, where $a_1, a_2, \ldots, a_v \in \{1, \ldots, T\}$. Unit 220 includes V multiplexers (Mux) 222a through 222v. Each multiplexer 222 receives the V scaled symbols from multipliers 212a through 212v and provides one of the V scaled symbols at its output. Multiplexers 222a through 222v perform the matrix multiplication with the T×V permutation matrix P(k) and provide V mapped symbols $s_{a_1}(k)$ through $s_{a_v}(k)$ for the V selected virtual antennas and T−V null symbols that are discarded. In other embodiments, a scaled output symbol may be mapped to multiple virtual antennas.

Unit 230 multiplies each mapped symbol with a respective column of matrix U and generates a vector for that symbol. Unit 230 includes V multiplier sets 232a through 232v for the V virtual antennas and T summers 236a through 236t for the T transmit antennas. Each multiplier set 232 includes T multipliers 234 for the T transmit antennas. The mapped symbol $s_{a_1}(k)$ for virtual antenna $a_1$ is multiplied with T elements of column $u_{a_1}$ in matrix U by T multipliers 234aa through 234at to generate a vector with T elements. These T elements indicate this mapped symbol's components for the T transmit antennas. The mapped symbol for each remaining virtual antenna is multiplied with a respective column of U to generate a vector for that mapped symbol. Summer 236a sums the outputs of V multipliers 234aa through 234va and generates transmit symbol $x_1(k)$ for transmit antenna 1. Each remaining summer 236 sums the output of a respective set of V multipliers 234 and generates a transmit symbol for its transmit antenna. Summers 236a through 236t provide T transmit symbols $x_1(k)$ through $x_T(k)$ in vector x(k) for the T transmit antennas. Multipliers 234 and summers 236 perform the matrix multiplication with matrix U.

As shown in FIG. 2, each mapped symbol is sent from one virtual antenna but from all T transmit antennas. V vectors are obtained for the transmission of the V mapped symbols on the V selected virtual antennas. These V vectors are added to generate the transmit symbol vector x(k).

FIG. 3 shows a model 300 for the transmission scheme given by equation (1). TX spatial processor 130 at the transmitter receives the output symbol vector s(k) for each subcarrier and symbol period. Within TX spatial processor 130, power scaling unit 210 multiplies the output symbol vector s(k) with the gain matrix G. Symbol-to-virtual antenna mapping unit 220 multiplies the scaled symbol vector with the permutation matrix P(k) and generates a T×1 vector containing V mapped symbols to be sent over the V selected virtual antennas and T−V null symbols to be discarded. Spatial mapping unit 230 multiplies the permuted symbol vector with the orthonormal matrix U and generates the transmit symbol vector x(k). The transmit symbol vector x(k) is transmitted from the T transmit antennas and via a MIMO channel 250 to the R receive antennas at the receiver.

The received symbols at the receiver may be expressed as:

$$\underline{r}(k) = \underline{H}(k) \cdot \underline{x}(k) + \underline{n}(k),$$
$$= \underline{H}(k) \cdot \underline{U} \cdot \underline{P}(k) \cdot \underline{G} \cdot \underline{s}(k) + \underline{n}(k),$$
$$= \underline{H}_{virtual}(k) \cdot \underline{P}(k) \cdot \underline{G} \cdot \underline{s}(k) + \underline{n}(k),$$
$$= \underline{H}_{used}(k) \cdot \underline{s}(k) + \underline{n}(k),$$
Eq (3)

where H(k) is an R×T actual MIMO channel response matrix for subcarrier k,
$H_{virtual}(k)$ is an R×T virtual MIMO channel response matrix for subcarrier k,
$H_{used}(k)$ is an R×V used MIMO channel response matrix for subcarrier k,
r(k) is an R×1 vector containing R received symbols from the R receive antennas on subcarrier k in one symbol period, and
n(k) is an R×1 noise vector for subcarrier k.

For simplicity, the noise may be assumed to be additive white Gaussian noise (AWGN) with a zero mean vector and a covariance matrix of $n(k)=\sigma_n^2 \cdot I$, where $\sigma_n^2$ is the variance of the noise.

The virtual and used MIMO channel response matrices may be given as:

$$\underline{H}_{virtual}(k) = \underline{H}(k) \cdot \underline{U},$$
$$= [\underline{H}(k) \cdot \underline{u}_1 \quad \underline{H}(k) \cdot \underline{u}_2 \quad \ldots \quad \underline{H}(k) \cdot \underline{u}_T],$$
Eq (4)

$$\underline{H}_{used}(k) = \underline{H}_{virtual}(k) \cdot \underline{P}(k) \cdot \underline{G},$$
$$= [\underline{H}(k)\underline{u}_{a_1} \cdot g_1 \quad \underline{H}(k) \cdot \underline{u}_{a_2} \cdot g_2 \quad \ldots \quad \underline{H}(k) \cdot \underline{u}_{a_V} \cdot g_V],$$
Eq (5)

where $u_t$, for $t=1, \ldots, T$, is the t-th column of U for the t-th available virtual antenna,
$u_{a_v}$, for $v=1, \ldots, V$, is the column of U for the v-th used virtual antenna,
diag $\{G\}=\{g_1 \, g_2 \ldots g_v\}$ are the gains of V data streams sent from the V used virtual antennas, and
$\{u_{a_1} u_{a_2} \ldots u_{a_v}\} \subset \{u_1 u_2 \ldots u_T\}$.

The T transmit antennas are associated with T actual channel response vectors $h_1(k)$ through $h_T(k)$. The T available virtual antennas are associated with T virtual channel response vectors $h_{virtual,1}(k)=H(k)\cdot u_1$ through $h_{virtual,T}(k)=H(k)\cdot u_T$. Each vector $h_{virtual,t}(k)$ is formed with the entire actual MIMO channel response matrix H(k).

As shown in equation (4) and illustrated in FIG. 3, a virtual MIMO channel with T virtual antennas is formed with the orthonormal matrix U. A used MIMO channel is formed by the V virtual antennas that are used for transmission. The multiplication of H(k) with U does not change the statistical properties of H(k). Hence, the actual MIMO channel H(k) and the virtual MIMO channel $H_{virtual}(k)$ have similar performance. However, the multiplication with U allows for full utilization of the total transmit power for all T transmit antennas. The peak transmit power for each transmit antenna may be denoted as $P_{tx}$, and the total transmit power for the T transmit antennas may be denoted as $P_{total}=T \cdot P_{tx}$. If V output symbols are transmitted from V transmit antennas without multiplication with U, then each transmit antenna that is turned off results in the transmit power $P_{tx}$ for that transmit antenna being wasted. However, if V output symbols are transmitted from V virtual antennas with multiplication with U, then each output symbol is sent from all T transmit antennas, the full transmit power $P_{tx}$ for each transmit antenna may be used regardless of the number of virtual antennas selected for use, and the total transmit power $P_{total}$ for all T transmit antennas may be distributed across the V virtual antennas.

For the transmission scheme shown in equation (1), an R×T MIMO system is effectively reduced to an R×V MIMO system. The transmitter appears as if it has V virtual antennas rather than T transmit antennas, where $1 \leq V \leq T$.

The transmitter may transmit V data streams on V selected virtual antennas. The V selected virtual antennas may be associated with different signal qualities and may have different transmission capacities. In an embodiment, each data stream is sent from a respective virtual antenna. A suitable rate may be selected for each data stream based on the transmission capacity of the virtual antenna used for that data stream. In another embodiment, each data stream is sent across all V selected virtual antennas to achieve similar performance for all V data streams. If a single subcarrier is available for transmission, then each data stream may be sent from the V selected virtual antennas in different symbol periods. If multiple subcarriers are available for transmission, then each data stream may be sent from the V selected virtual antennas on different subcarriers. If each data stream is sent from all V selected virtual antennas, then a single rate may be selected for all V data streams based on the average transmission capacity for the V selected virtual antennas.

FIG. 4A shows an embodiment of transmitting two data streams from two virtual antennas. In this embodiment, four virtual antennas are available, virtual antennas 2 and 4 are selected for use, and virtual antennas 1 and 3 are not used. The output symbols for data stream 1 are sent from virtual antenna 2 on all K subcarriers. The output symbols for data stream 2 are sent from virtual antenna 4 on all K subcarriers.

In the embodiment shown in FIG. 4A, a single permutation matrix may be used for all K subcarriers and may be defined as follows:

$$\underline{P}(k) = \begin{bmatrix} 0 & 0 \\ 1 & 0 \\ 0 & 0 \\ 0 & 1 \end{bmatrix}, \text{ for } k = 1, \ldots, K.$$
Eq (6)

Each row of permutation matrix P(k) corresponds to one available virtual antenna, and each column of P(k) corresponds to one data stream. For each virtual antenna that is not used for transmission, the corresponding row of P(k) contains all zeros. For each data stream, the corresponding column of P(k) contains an entry of '1' for the virtual antenna used for that data stream.

FIG. 4B shows an embodiment of transmitting three data streams cyclically across the K subcarriers of three virtual antennas. In this embodiment, four virtual antennas are available, virtual antennas 1, 3 and 4 are selected for use, and virtual antenna 2 is not used. The output symbols for data stream 1 are sent from virtual antenna 1 on subcarriers 1, 4, 7, ..., from virtual antenna 3 on subcarriers 2, 5, 8, ..., and from virtual antenna 4 on subcarriers 3, 6, 9, .... The output symbols for each of the other two data streams are also sent across the K subcarriers of all three selected virtual antennas, as shown in FIG. 4B.

In the embodiment shown in FIG. 4B, the permutation matrices may be defined as follows:

$$\underline{P}(1) = \begin{bmatrix} 1 & 0 & 0 \\ 0 & 0 & 0 \\ 0 & 1 & 0 \\ 0 & 0 & 1 \end{bmatrix}, \quad \text{Eq (7)}$$

$$\underline{P}(2) = \begin{bmatrix} 0 & 0 & 1 \\ 0 & 0 & 0 \\ 1 & 0 & 0 \\ 0 & 1 & 0 \end{bmatrix},$$

$$\underline{P}(3) = \begin{bmatrix} 0 & 1 & 0 \\ 0 & 0 & 0 \\ 0 & 0 & 1 \\ 1 & 0 & 0 \end{bmatrix},$$

and so on.

Data streams 1, 2 and 3 are associated with columns 1, 2 and 3, respectively, of each permutation matrix. For each data stream, the virtual antenna used for the data stream is indicated by an entry of '1' in the row corresponding to the virtual antenna. As shown in FIG. 4B and indicated by equation (7), each data stream hops from one selected virtual antenna to the next selected virtual antenna across the K subcarriers and wraps around to the first selected virtual antenna upon reaching the last selected virtual antenna.

FIGS. 4A and 4B show specific embodiments of mapping data streams to virtual antennas. In general, any number of data streams may be sent from any number of virtual antennas. The data streams may be mapped to the selected virtual antennas in a deterministic manner (e.g., cyclically or sequentially using full possible permutations) or a pseudo-random manner based on a pseudo-random number (PN) sequence that is known to both the transmitter and receiver. A given data stream may be mapped to all selected virtual antennas using any stream permutation or mapping scheme, one example of which is shown in FIG. 4B.

2. Receiver Processing

The receiver may use various detection techniques to recover the output symbols sent by the transmitter. These detection techniques include a minimum mean square error (MMSE) technique, a zero-forcing (ZF) technique, a maximal ratio combining (MRC) technique, and a successive interference cancellation (SIC) technique. The receiver may derive a spatial filter matrix based on the MMSE, ZF or MRC technique, as follows:

$$M_{mmse}(k) = D_{mmse}(k) \cdot [H_{used}^H(k) \cdot H_{used}(k) + \sigma_n^2 \cdot I]^{-1} \cdot H_{used}^H(k), \quad \text{Eq (8)}$$

$$M_{zf}(k) = [H_{used}^H(k) \cdot H_{used}(k)]^{-1} \cdot H_{used}^H(k), \text{ and} \quad \text{Eq (9)}$$

$$M_{mrc}(k) = D_{mrc}(k) \cdot H_{used}^H(k), \quad \text{Eq (10)}$$

where $Q(k) = [H_{used}^H(k) \cdot H_{used}(k) + \sigma_n^2 \cdot I]^{-1} \cdot H_{used}^H(k) \cdot H_{used}(k),$ $D_{mmse}(k) = [\text{diag}\{Q(k)\}]^{-1}$, and $D_{mrc}(k) = [\text{diag}\{H_{used}^H(k) \cdot H_{used}(k)\}]^{-1}$.

In equations (8) and (10), $D_{mmse}(k)$ and $D_{mrc}(k)$ are V×V diagonal matrices of scaling values used to obtain normalized estimates of the output symbols.

The receiver may perform detection as follows:

$$\hat{s}(k) = M(k) \cdot r(k) = s(k) + \tilde{n}(k), \quad \text{Eq (11)}$$

where M(k) is a V×R spatial filter matrix that may be $M_{mmse}(k)$, $M_{zf}(k)$ or $M_{mrc}(k)$, $\hat{s}(k)$ is a V×1 vector with V symbol estimates, and $\tilde{n}(k)$ is a vector of noise after the detection.

The receiver may obtain an estimate of H(k), $H_{virtual}(k)$ and/or $H_{used}(k)$ based on a pilot received from the transmitter. For simplicity, the description herein assumes no channel estimation error. The receiver may derive $H_{used}(k)$ based on H(k) or $H_{virtual}(k)$ and the known U, P(k) and G. The receiver may then derive M(k) based on $H_{used}(k)$ for the V selected virtual antennas. The dimension of M(k) is dependent on the number of virtual antennas used for transmission. The symbol estimates in $\hat{s}(k)$ are estimates of the output symbols in s(k).

The receiver may perform detection as shown in equation (11) for each subcarrier k in each symbol period n to obtain symbol estimates for that subcarrier and symbol period. The receiver may demap the symbol estimates for all subcarriers and symbol periods into streams in a manner complementary to the symbol-to-virtual antenna mapping by the transmitter. The receiver may then process (e.g., demodulate, deinterleave, and decode) the streams of symbol estimates to obtain decoded data streams.

The quality of the symbol estimates is dependent on the detection technique used by the receiver. In general, signal quality may be quantified by signal-to-noise ratio (SNR), signal-to-noise-and-interference ratio (SINR), energy-per-symbol-to-noise ratio (Es/No), and so on. For clarity, SNR is used to represent signal quality in the description below.

The SNR for the MMSE technique may be expressed as:

$$\gamma_{mmse,v}(k) = \frac{q_v(k)}{1 - q_v(k)}, \quad \text{for } v = 1, \ldots, T, \quad \text{Eq (12)}$$

where $q_v(k)$ is the v-th diagonal element of Q(k) for subcarrier k, and $\gamma_{mmse,v}(k)$ is the SNR of subcarrier k of virtual antenna v with MMSE detection.

The SNR for the ZF technique may be expressed as:

$$\gamma_{zf,v}(k) = \frac{1}{r_v(k) \cdot \sigma_n^2}, \quad \text{for } v = 1, \ldots, T, \quad \text{Eq (13)}$$

where $r_v(k)$ is the v-th diagonal element of diag $\{[H_{used}^H(k) \cdot H_{used}(k)]^{-1}\}$ for subcarrier k, and $\gamma_{zf,v}(k)$ is the SNR of subcarrier k of virtual antenna v with ZF detection Equations (12) and (13) assume that the average power of each element of the transmit symbol vector s(k) is unity. The SNRs for other detection techniques are known in the art and not described herein.

Equations (12) and (13) give SNRs in linear units. SNR may also be given in decibels (dB), as follows:

$$SNR_v(k) = 10 \log_{10}\{\gamma_v(k)\}, \quad \text{Eq (14)}$$

where $\gamma_v(k)$ is SNR in linear units and $SNR_v(k)$ is the corresponding SNR in dB.

For the SIC technique, the receiver recovers the V data streams in V stages or layers, one data stream in each stage, and cancels the interference from each decoded data stream prior to recovering the next data stream. For the first stage, the receiver performs detection on the received symbols (e.g., using the MMSE, ZF or MRC technique as shown in equation (11)) and obtains symbol estimates for one data stream. The receiver then processes (e.g., demodulates, deinterleaves, and decodes) the symbol estimates to obtain a decoded data stream. The receiver then estimates the interference due to this data stream by (1) re-encoding, interleaving, and symbol mapping the decoded data stream in the same manner performed by the transmitter for this stream and (2) multiplying the reconstructed output symbols with the used MIMO channel response vectors to obtain interference components due to this stream. The receiver then subtracts the interference components from the received symbols to obtain modified received symbols. For each subsequent stage, the receiver processes the modified received symbols from the prior stage in the same manner as the first stage to recover one data stream.

For the SIC technique, the SNR of each decoded data steam is dependent on (1) the detection technique (e.g., MMSE, ZF or MRC) used for the stream, (2) the specific stage in which the data stream is recovered, and (3) the amount of interference due to data streams recovered in later stages. In general, SNR improves for data streams recovered in later stages because the interference from data streams recovered in prior stages is canceled. This may allow higher rates to be used for the data streams recovered in later stages.

In an aspect, the performance of different sets or combinations of virtual antenna(s) is evaluated and the set of virtual antenna(s) with the best performance is selected for use. Performance may be quantified by various metrics such as signal quality (e.g., SNR), throughput, overall rate, and so on. The virtual antenna selection may be performed in various manners.

In an embodiment, all possible sets of one or more virtual antennas are evaluated. Each possible virtual antenna set is also referred to as a hypothesis. There are $2^T-1$ total hypotheses for T available virtual antennas—one hypothesis for T virtual antennas, T hypotheses for T−1 virtual antennas, and so on, and T hypotheses for one virtual antenna. M hypotheses may be evaluated, where $M=2^T-1$ if all possible hypotheses are evaluated. Hypothesis m, for m=1, . . . , M, is for a specific set of virtual antenna(s) that is denoted as $A_m$. The M hypotheses are for M different virtual antenna sets.

In an embodiment, performance is determined with uniform distribution of the total transmit power across the selected virtual antennas. For a hypothesis with V virtual antennas, where $1 \leq V \leq T$, the total transmit power may be distributed as follows:

$$P_{m,v}(k) = \frac{T \cdot P_{tx}}{V \cdot K}, \text{ for } v \in A_m, \quad \text{Eq (15)}$$

where $P_{m,v}(k)$ is the transmit power for subcarrier k of virtual antenna v in hypothesis m. In equation (15), the total data transmit power $P_{total}=T \cdot P_{tx}$ is uniformly distributed across the V virtual antennas, and each virtual antenna is allocated $P_{va}=T \cdot P_{tx}/V$. The allocated transmit power $P_{va}$ for each virtual antenna is then uniformly distributed across the K subcarriers of that virtual antenna. $P_{va}$ and $P_{m,v}(k)$ are larger for hypotheses with fewer virtual antennas. Equation (15) also indicates that only the virtual antenna(s) in set $A_m$ are allocated transmit power, and all other virtual antennas are allocated zero transmit power (except for possible allocation for pilot transmissions).

For each hypothesis m, the SNR of each subcarrier of each virtual antenna in the hypothesis may be computed, e.g., as shown in equations (12) through (14). It should be noted that $q_v(k)$ and $r_v(k)$ are dependent on the power $P_{m,v}(k)$ used to compute $H_{used}(k)$. Therefore, the SNR is dependent on the number of virtual antennas in the hypothesis and is larger if the hypothesis has fewer virtual antennas because of the larger $P_{m,v}(k)$.

In an embodiment, performance is quantified by average SNR, which may be computed as follows:

$$SNR_{avg,m} = \frac{1}{V \cdot K} \cdot \sum_{v \in A_m} \sum_{k=1}^{K} SNR_{m,v}(k), \quad \text{Eq (16)}$$

where $SNR_{m,v}(k)$ is the SNR of subcarrier k of virtual antenna v in hypothesis m, and $SNR_{avg,m}$ is the average SNR for hypothesis m.

$SNR_{m,v}(k)$ and $SNR_{avg,m}$ are in units of dB.

In another embodiment, performance is quantified by throughput, which is also referred to as spectral efficiency, capacity, and so on. The throughput for hypothesis m may be determined based on an unconstrained capacity function, as follows:

$$TP_m = \sum_{v \in A_m} \sum_{k=1}^{K} \log_2[1 + \gamma_{m,v}(k)], \quad \text{Eq (17)}$$

where $\gamma_{m,v}(k)$ is the SNR of subcarrier k of virtual antenna v in hypothesis m, and $TP_m$ is the throughput for hypothesis m.

In equation (17), $\gamma_{m,v}(k)$ is in linear units, and the throughput of each subcarrier of each virtual antenna is given as $\log_2[1+\gamma_{m,v}(k)]$. The throughput for all subcarriers of all virtual antennas in hypothesis m is accumulated to obtain the overall throughput for the hypothesis. The unconstrained capacity function in equation (17) assumes that data can be reliably transmitted at the capacity of the MIMO channel.

The throughput for hypothesis m may also be determined based on a constrained capacity function, as follows:

$$TP_m = \sum_{v \in A_m} \sum_{k=1}^{K} \log_2[1 + Q \cdot \gamma_{m,v}(k)], \quad \text{Eq (18)}$$

where Q is a penalty factor used to account for various factors such as modulation scheme, coding scheme, code rate, packet size, channel estimation errors, and so on. Throughput may also be computed based on other capacity functions.

In yet another embodiment, performance is quantified by an overall rate. The system may support a set of rates. Each rate may be associated with a specific coding and modulation scheme, a specific code rate, a specific spectral efficiency, and a specific minimum SNR required to achieve a target level of performance, e.g., 1% packet error rate (PER). For each hypothesis m, a rate may be selected for each virtual antenna in the hypothesis based on the SNRs for that virtual antenna. The rate selection may be performed in various manners.

For hypothesis m, an average SNR may be computed for each virtual antenna as follows:

$$SNR_{avg,m,v} = \frac{1}{K} \cdot \sum_{k=1}^{K} SNR_{m,v}(k), \quad \text{for } v \in A_m, \qquad \text{Eq (19)}$$

where $SNR_{avg,m,v}$ is the average SNR for virtual antenna v in hypothesis m.

An effective SNR for each virtual antenna may also be computed as follows:

$$SNR_{eff,m,v} = SNR_{avg,m,v} - SNR_{bo,m,v}, \text{ for } v \in A_m, \qquad \text{Eq (20)}$$

where $SNR_{bo,m,v}$ is a backoff factor for virtual antenna v in hypothesis m, and $SNR_{eff,m,v}$ is the effective SNR for virtual antenna v in hypothesis m.

The backoff factor may be used to account for variability in SNRs across the K subcarriers of virtual antenna v and may be set as $SNR_{bo,m,v} = K_{snr} \sigma^2_{snr,m,v}$, where $\sigma^2_{snr,m,v}$ is the variance of the SNRs for virtual antenna v and $K_{snr}$ is a constant. The backoff factor may also be used to account for other factors such as, e.g., the coding and modulation used for virtual antenna v, the current PER, and so on.

An equivalent SNR for each virtual antenna may also be computed as follows:

$$TP_{m,v} = \frac{1}{K} \cdot \sum_{k=1}^{K} \log_2[1 + Q \cdot \gamma_{m,v}(k)], \qquad \text{Eq (21a)}$$

and $$SNR_{eq,m,v} = 10\log_{10}\left(\frac{2^{TP_{m,v}} - 1}{Q}\right), \qquad \text{Eq (21b)}$$

for $v \in A_m$, where $TP_{m,v}$ is the average throughput for each subcarrier of virtual antenna v in hypothesis m, and $SNR_{eq,m,v}$ is the equivalent SNR for virtual antenna v in hypothesis m.

Equation (21a) computes the average throughput for each subcarrier based on the SNRs for all K subcarriers. Equation (21b) gives an SNR that provides the average throughput from equation (21a).

$SNR_{avg,m,v}$, $SNR_{eff,m,v}$, or $SNR_{eq,m,v}$ for each virtual antenna may be provided to a lookup table of rates versus required SNRs. The lookup table may then provide the highest rate that may be used for each virtual antenna. The selected rates for all virtual antennas in hypothesis m may be accumulated to obtain the overall rate for hypothesis m.

Performance may also be quantified by other metrics, and this is within the scope of the present invention. M metric values are obtained for M hypotheses that are evaluated. These metric values may be for average SNR, throughput, overall rate, and so on. The hypothesis with the best metric value (e.g., the highest average SNR, the highest throughput, or the highest overall rate) among the M hypotheses may be identified. The set of virtual antenna(s) for the hypothesis with the best metric value may be selected for use.

Figure 5:
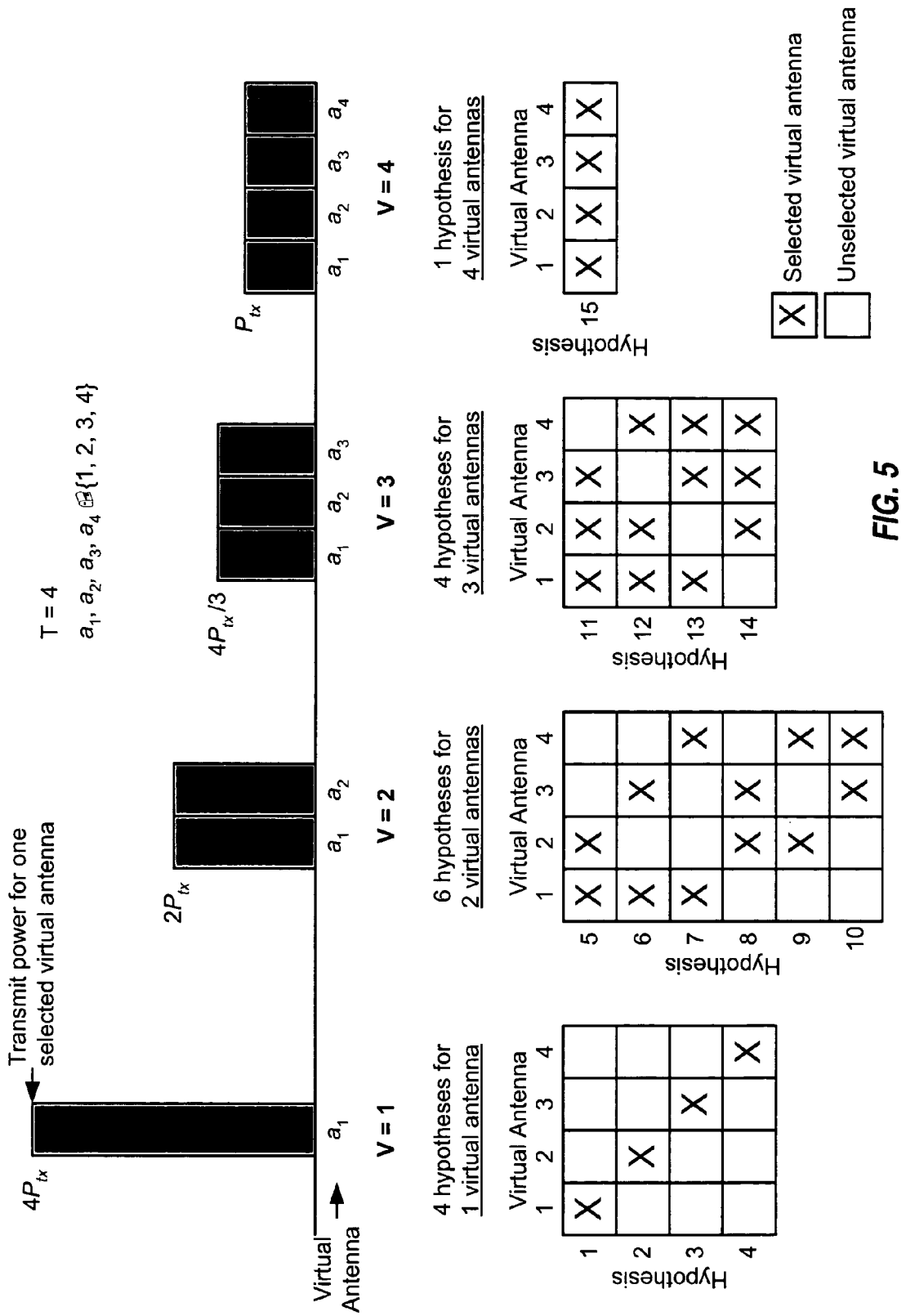
FIG. 5 shows virtual antenna selection for four virtual antennas.

FIG. 5 shows virtual antenna selection for a case with four available virtual antennas. With T=4, there are $2^T-1=15$ total hypotheses that are denoted as hypotheses 1 through 15. Four hypotheses 1 through 4 are for one virtual antenna, six hypotheses 5 through 10 are for two virtual antennas, four hypotheses 11 through 14 are for three virtual antennas, and one hypothesis 15 is for four virtual antennas. The set of virtual antenna(s) for each hypothesis is shown in FIG. 5. For example, hypothesis 2 is for one virtual antenna 2 ($a_1=2$), hypothesis 6 is for two virtual antennas 1 and 3 ($a_1=1$ and $a_2=3$), hypothesis 12 is for three virtual antennas 1, 2 and 4 ($a_1=1$, $a_2=2$ and $a_3=4$), and hypothesis 15 is for all four virtual antennas 1 through 4 ($a_1=1$, $a_2=2$, $a_3=3$ and $a_4=4$).

The total transmit power $4P_{tx}$ may be uniformly distributed across all virtual antennas in each hypothesis. For each hypothesis with one virtual antenna, $4P_{tx}$ is allocated to the single virtual antenna. For each hypothesis with two virtual antennas, $2P_{tx}$ is allocated to each virtual antenna. For each hypothesis with three virtual antennas, $4P_{tx}/3$ is allocated to each virtual antenna. For the hypothesis with four virtual antennas, $P_{tx}$ is allocated to each virtual antenna. The performance of each hypothesis may be determined based on any of the metrics described above. The hypothesis with the highest metric value may be identified, and the set of virtual antenna(s) for this hypothesis may be selected for use.

In another embodiment, the total transmit power $P_{total}$ is non-uniformly distributed across the virtual antennas based on water-filling, which is also referred to as water-pouring. For each hypothesis m, the SNR of each subcarrier of each virtual antenna may be initially determined based on an assumption of $P_{tx}$ being allocated to the virtual antenna. The average SNR for each virtual antenna may then be determined, e.g., as shown in equation (19). The total transmit power $P_{total}$ may then be distributed across the virtual antennas in the hypothesis such that the virtual antenna with the highest average SNR is allocated the most transmit power, and the virtual antenna with the lowest average SNR is allocated the least amount of transmit power. In general, non-uniform power allocation is more practical in a TDD communication system in which a transmitter may readily obtain full knowledge of the wireless channel through channel reciprocity. In an FDD communication system, non-uniform power allocation typically requires a large amount of feedback information such as, e.g., the best precoding matrix for eigenmode decomposition of the wireless channel. Alternatively, for each hypothesis, a receiver may evaluate multiple predetermined unequal power distributions across the virtual antennas and may send the best power distribution and the best virtual antenna subset to the transmitter.

FIG. 6 shows an example of power distribution across three virtual antennas $a_1$, $a_2$ and $a_3$ with water-filling. The average SNR for each virtual antenna $a_v$, $SNR_{a_v}$, for $v=1, 2, 3$, is determined with an assumption of $P_{tx}$ being allocated to the virtual antenna. The inverse of the average SNR, $1/SNR_{a_v}$, for each virtual antenna is computed and plotted in FIG. 6. The total transmit power $P_{total}$ is distributed across the three virtual antennas such that the final power level $P_{top}$ is constant across the three virtual antennas. The total transmit power is represented by the shaded area in FIG. 6. The transmit power $P_{av}$ allocated to each virtual antenna is equal to the final power level minus the inverse SNR for the virtual antenna, or $P_{top} - 1/SNR_{a_v}$. Water-filling is described by Robert G. Gallager in "Information Theory and Reliable Communication," John Wiley and Sons, 1968, which is publicly available.

For each hypothesis, the total transmit power may be distributed across the virtual antennas in the hypothesis with water-filling. The performance of the hypothesis may then be evaluated based on the transmit power allocated to each virtual antenna. The SNRs of each subcarrier of each virtual antenna in the hypothesis may be determined. A metric value may then be computed for the hypothesis based on the SNRs for all subcarriers and virtual antennas in the hypothesis. The hypothesis with the best metric value may be selected for use.

In yet another embodiment, the total transmit power $P_{total}$ is non-uniformly distributed across the virtual antennas based on channel inversion. For each hypothesis m, the average SNR for each virtual antenna in the hypothesis may be determined based on an assumption of $P_{tx}$ being allocated to the virtual antenna. The total transmit power $P_{total}$ may then be distributed across the virtual antennas in the hypothesis such that these virtual antennas achieve similar average SNR. Techniques for performing channel inversion are described in commonly assigned U.S. patent application Ser. No. 10/179, 442, entitled "SIGNAL PROCESSING WITH CHANNEL EIGENMODE DECOMPOSITION AND CHANNEL INVERSION FOR MIMO SYSTEMS," filed Jun. 24, 2002. Channel inversion may allow the same rate to be used for all virtual antennas and may simplify processing at both the transmitter and receiver.

Performance may also be determined based on other schemes for distributing the total transmit power $P_{total}$ non-uniformly across the virtual antennas.

3. Feedback

In an embodiment, the receiver performs virtual antenna selection, evaluates different sets of virtual antenna(s), and selects the set of virtual antenna(s) with the best performance. The receiver then sends channel state information for the selected set of virtual antenna(s) to the transmitter. The channel state information may convey various types of information.

In an embodiment, the channel state information indicates the selected set of V virtual antennas, where $V \geq 1$. Since there are $2^T-1$ possible hypotheses for T virtual antennas, the best hypothesis and hence the selected set of V virtual antennas may be conveyed with T bits. The transmitter may perform simplified and quantized water-filling and may distribute the total transmit power $P_{total}$ uniformly across the V selected virtual antennas.

In an embodiment, the channel state information indicates the SNR for each selected virtual antenna, which may be computed as shown in equations (19) through (21). The transmitter may select a rate for each virtual antenna based on its SNR. The transmitter may distribute the total transmit power $P_{total}$ (1) uniformly across the V selected virtual antennas or (2) non-uniformly across the V selected virtual antennas (e.g., using water-filling or channel inversion) based on the SNRs for these V virtual antennas. SNR-based non-uniform power distribution may be especially valid when information for the best preceding matrix is available at the transmitter. This embodiment may be used, e.g., for the transmission scheme shown in FIG. 4A with one data stream being sent from each selected virtual antenna.

In another embodiment, the channel state information indicates an average SNR for all V selected virtual antennas, which may be computed as shown in equation (16). The transmitter may select a rate for all V virtual antennas based on the average SNR. This embodiment may be used, e.g., for the transmission scheme shown in FIG. 4B with each data stream being sent from all V selected virtual antennas and the V data streams achieving similar SNRs.

In yet another embodiment, the channel state information indicates a base SNR and a sufficient number of delta SNRs for the V selected virtual antennas. This embodiment is especially effective for the transmission scheme shown in FIG. 4B with each data stream being sent across all V selected virtual antennas and with a SIC receiver being used to recover the data streams. The base SNR may be the lowest SNR for the V selected virtual antennas, the lowest SNR for the V data streams, the SNR for the data stream that is detected first with the SIC technique, and so on. Each delta SNR may indicate the difference in SNRs for two virtual antennas, for two data streams, and so on.

In an embodiment, the SNRs for the V virtual antennas may be ranked from lowest to highest, the base SNR may be the lowest SNR, the first delta SNR may be the difference between the lowest SNR and the second lowest SNR, the second delta SNR may be the difference between the second lowest SNR and the third lowest SNR, and so on. In another embodiment, the SNRs for the V data streams may be ranked from lowest to highest, and the base SNR and the delta SNRs may be defined as described above. If V data streams are transmitted such that they observe similar SNRs with linear detection (e.g., as shown in FIG. 4B), then the base SNR may indicate the average SNR for the V data streams, and the delta SNRs may be equal to zero. This may also be the case when the transmitter performs precoding and permutes the data streams over the column vectors of the precoding matrix. Ideally, if the multiple data streams are separated by the preceding at the transmitter, which is the case with singular value decomposition, then the receiver does not need to perform SIC to achieve the maximum spectral efficiency. However, in practice, the preceding matrix typically does not match perfectly with the singular decomposition matrix, and the receiver may perform SIC to maximize throughput. If the data streams that observe similar SNRs with linear detection are recovered with the SIC technique, then the base SNR may indicate the SNR of the data stream that is recovered first, and the delta SNR for each subsequently recovered data stream may indicate the improvement in SNR over the prior recovered data stream.

In an embodiment, only one delta SNR may be used, and the SNR for each virtual antenna or data stream may be given as:

$$SNR_v = SNR_{base} + (v-1) \cdot SNR_{delta}, \text{ for } v=1, \ldots, V, \qquad \text{Eq (22)}$$

where $SNR_v$ is the SNR for virtual antenna $a_v$ or data stream v. The embodiment shown in equation (22) assumes that the SNR improves by the same amount across the V selected virtual antennas or V data streams and that the SIC gain between consecutive stages or layers is almost constant.

In another embodiment, the channel state information indicates a rate for each selected virtual antenna. The system may support a set of rates, as described above, and the rate for each virtual antenna may be selected based on the SNR for that virtual antenna. In yet another embodiment, the channel state information indicates a single rate for all V selected virtual antennas, which may be selected based on the average SNR for these virtual antennas. In yet another embodiment, the channel state information indicates a base rate and one or more delta rates for the selected virtual antennas. This embodiment may be useful for the transmission scheme shown in FIG. 4B with a SIC receiver. In yet another embodiment, the channel state information indicates a rate combination for the V selected virtual antennas. The system may support a vector-quantized rate set that contains a number of allowed rate combinations, which are also called modulation coding schemes (MCS). Each allowed rate combination is associated with a specific number of data streams to transmit and a specific rate for each data stream. A rate combination may be selected for the V selected virtual antennas based on the SNRs for the virtual antennas.

In yet another embodiment, the channel state information indicates one or more orthonormal matrices (or precoding matrices) selected for use from among a set of orthonormal matrices available for use. The transmitter performs precoding with the one or more selected orthonormal matrices.

Performance for all hypotheses of each orthonormal matrix may be evaluated as described above. The orthonormal matrix and the set of virtual antenna(s) with the best performance may be provided by the channel state information.

In general, the channel state information may convey various types of information such as the selected set of V virtual antennas, signal quality (e.g., SNRs), rates, transmit power, matrices, pilot, other information, or a combination thereof.

In another embodiment, the transmitter performs the virtual antenna selection, e.g., using channel state information from the receiver.

In an embodiment, the transmitter transmits a pilot in a manner to allow the receiver to estimate the SNRs for all T available virtual antennas even if data is sent on only V selected virtual antennas. The transmitter may transmit the pilot by cycling through the T virtual antennas in different symbol periods, e.g., virtual antenna 1 in symbol period n, then virtual antenna 2 in symbol period n+1, and so on. The transmitter may also transmit the pilot from the T virtual antennas on different subcarriers, e.g., on subcarrier $k_1$ of virtual antenna 1, subcarrier $k_2$ of virtual antenna 2, and so on. In another embodiment, the transmitter transmits a main pilot on the V selected virtual antennas and transmits an auxiliary pilot on the unselected virtual antennas. The main pilot may be transmitted more frequently and/or on more subcarriers than the auxiliary pilot. The transmitter may also transmit the pilot in various other manners.

FIG. 7 shows an embodiment of a process 700 to select and use virtual antennas. Multiple hypotheses for multiple virtual antennas formed with multiple physical antennas are evaluated based on at least one metric, e.g., signal quality, throughput, overall rate, and so on (block 712). Each hypothesis corresponds to a different set of at least one virtual antenna. The multiple virtual antennas are formed with one or more matrices that map each virtual antenna to some or all of the physical antennas. The hypothesis with the best performance is selected from among the multiple hypotheses evaluated (block 714).

In an embodiment, the signal quality for each hypothesis is determined, and the hypothesis with the highest signal quality is selected. In another embodiment, the throughput for each hypothesis is determined, and the hypothesis with the highest throughput is selected. In yet another embodiment, the overall rate for each hypothesis is determined, and the hypothesis with the highest overall rate is selected. For all embodiments, each hypothesis may be evaluated with the total transmit power being distributed uniformly or non-uniformly across the virtual antenna(s) in the hypothesis. The hypotheses may be evaluated in other manners.

Block 714 essentially selects at least one virtual antenna from among the multiple virtual antennas. If the virtual antenna selection is performed by the receiver, then channel state information for the selected virtual antenna(s) is sent to the transmitter (block 716). The channel state information may convey various types of information such as the selected virtual antenna(s), the signal quality or rate(s) for the selected virtual antenna(s), and so on. The transmitter and/or receiver may select at least one rate for the selected virtual antenna(s) based on the signal quality. The selected virtual antenna(s) are used for data transmission (block 718).

FIG. 8 shows an embodiment of an apparatus 800 to select and use virtual antennas. Apparatus 800 includes means for evaluating multiple hypotheses for multiple virtual antennas formed with multiple physical antennas (block 812), means for selecting a hypothesis from among the multiple hypotheses (block 814), means for sending channel state information for the at least one selected virtual antenna to the transmitter (block 816), and means for using the selected virtual antenna(s) for data transmission (block 818).

FIG. 9 shows an embodiment of a process 900 to transmit data from virtual antennas. Channel state information is received for at least one virtual antenna selected from among multiple virtual antennas formed with multiple physical antennas (block 912). The channel state information may convey any of the information described above. The total transmit power may be distributed (1) uniformly across the selected virtual antenna(s) or (2) non-uniformly across the selected virtual antenna(s) based on the channel state information (block 914). At least one rate is selected for the selected virtual antenna(s) based on the channel state information and the power distribution (block 916). A data transmission is sent from the selected virtual antenna(s) at the selected rate(s) (block 918). The data transmission may comprise one or more data streams. Each data stream may be mapped to a respective selected virtual antenna (e.g., as shown in FIG. 4A) or may be mapped to all of the selected virtual antenna(s) (e.g., as shown in FIG. 4B).

FIG. 10 shows an embodiment of an apparatus 1000 to transmit data from virtual antennas. Apparatus 1000 includes means for receiving channel state information for at least one virtual antenna selected from among multiple virtual antennas formed with multiple physical antennas (block 1012), means for distributing total transmit power uniformly or non-uniformly across the selected virtual antenna(s) (block 1014), means for selecting at least one rate for the selected virtual antenna(s) based on the channel state information and the power distribution (block 1016), and means for sending a data transmission from the selected virtual antenna(s) at the selected rate(s) (block 1018).

The techniques described herein may be implemented by various means. For example, these techniques may be implemented in hardware, firmware, software, or a combination thereof. For a hardware implementation, the processing units used to select virtual antennas, to transmit data from the selected virtual antenna(s), and/or to receive data from the selected virtual antenna(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 142 or 192 in FIG. 1) and executed by a processor (e.g., processor 140 or 190). The memory may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:
1. An apparatus comprising:
   at least one processor configured to select at least one virtual antenna from among multiple virtual antennas formed with multiple physical antennas and to provide an indication of use of the at least one selected virtual antenna for data transmission, wherein each virtual antenna is mapped to some or all physical antennas by a different mapping, wherein the at least one processor is also configured to determine an overall rate for each different set of at least one virtual antenna and to select at least one rate for the at least one selected virtual antenna based on signal quality for the at least one selected virtual antenna; and a memory coupled to the at least one processor.

2. The apparatus of claim 1, wherein the at least one processor is configured to evaluate multiple hypotheses, each hypothesis corresponding to a different set of at least one virtual antenna, and to select a hypothesis from among the multiple hypotheses, wherein the at least one selected virtual antenna is for the selected hypothesis.

3. The apparatus of claim 2, wherein the at least one processor is configured to determine performance of each of the multiple hypotheses based on at least one metric, and to select a hypothesis with best performance.

4. The apparatus of claim 2, wherein the at least one processor is configured to determine signal quality for each of the multiple hypotheses, and to select a hypothesis with highest signal quality.

5. The apparatus of claim 2, wherein the at least one processor is configured to determine throughput for each of the multiple hypotheses, and to select a hypothesis with highest throughput.

6. The apparatus of claim 2, wherein the at least one processor is configured to select a hypothesis with highest overall rate.

7. The apparatus of claim 2, wherein the at least one processor is configured to distribute total transmit power uniformly across the at least one virtual antenna for each of the multiple hypotheses.

8. The apparatus of claim 2, wherein the at least one processor is configured to distribute total transmit power non-uniformly across the at least one virtual antenna for each of the multiple hypotheses.

9. The apparatus of claim 1, wherein the at least one processor is configured to instruct sending the data transmission via the at least one selected virtual antenna coupled with the at least one processor to a receiver.

10. The apparatus of claim 1, wherein the at least one processor is configured to send channel state information for the at least one selected virtual antenna to a transmitter.

11. The apparatus of claim 10, wherein the channel state information identifies the at least one selected virtual antenna.

12. The apparatus of claim 10, wherein the channel state information indicates signal quality or at least one rate for the at least one selected virtual antenna.

13. The apparatus of claim 10, wherein the channel state information indicates at least one matrix used to form the at least one selected virtual antenna.

14. The apparatus of claim 1, wherein the multiple virtual antennas are formed with at least one matrix that maps each virtual antenna to the multiple physical antennas.

15. The apparatus of claim 1, wherein the overall rate is an accumulation of all of the selected rates for the set of at least one virtual antenna.

16. An apparatus comprising:
at least one processor configured to select at least one virtual antenna from among multiple virtual antennas formed with multiple physical antennas and to provide an indication of use of the at least one selected virtual antenna for data transmission, wherein the at least one processor is configured to send channel state information for the at least one selected virtual antenna to a transmitter and to receive the data transmission from the transmitter via the at least one selected virtual antenna, wherein the channel state information indicates a base signal quality and at least one delta signal quality, wherein the base signal quality is for one selected virtual antenna or one data stream, and wherein the at least one delta signal quality is for remaining selected virtual antennas or remaining data streams, wherein the at least one processor is also configured to determine an overall rate for each different set of at least one virtual antenna and to select at least one rate for the at least one selected virtual antenna based on the base signal quality and the delta signal quality for the at least one selected virtual antenna; and a memory coupled to the at least one processor.

17. A method for wireless communications, wherein the method is performed by a network entity, the method comprising:
selecting at least one virtual antenna from among multiple virtual antennas formed with multiple physical antennas, wherein each virtual antenna is mapped to some or all physical antennas by a different mapping;
determining an overall rate for each different set of at least one virtual antenna;
selecting at least one rate for the at least one selected virtual antenna based on signal quality for the at least one selected virtual antenna; and
providing an indication of the at least one selected virtual antenna for use for data transmission.

18. The method of claim 17, wherein the selecting the at least one virtual antenna comprises:
evaluating multiple hypotheses, each hypothesis corresponding to a different set of at least one virtual antenna, and
selecting a hypothesis from among the multiple hypotheses, wherein the at least one selected virtual antenna is for the selected hypothesis.

19. The method of claim 18, wherein the evaluating the multiple hypotheses comprises determining performance of each of the multiple hypotheses based on at least one metric, and wherein the selecting the hypothesis comprises selecting the hypothesis with best performance.

20. The method of claim 19, wherein the evaluating the multiple hypotheses comprises distributing total transmit power uniformly across the at least one virtual antenna for each of the multiple hypotheses.

21. The method of claim 17, further comprising:
sending channel state information for the at least one selected virtual antenna to a transmitter; and
receiving the data transmission from the transmitter via the at least one selected virtual antenna.

22. An apparatus comprising:
means for selecting at least one virtual antenna from among multiple virtual antennas formed with multiple physical antennas, wherein each virtual antenna is mapped to some or all physical antennas by a different mapping;
means for determining an overall rate for each different set of at least one virtual antenna;
means for selecting at least one rate for the at least one selected virtual antenna based on signal quality for the at least one selected virtual antenna; and
means for providing an indication of the at least one selected virtual antenna for use for data transmission.

23. The apparatus of claim 22, wherein the means for selecting the at least one virtual antenna comprises:
means for evaluating multiple hypotheses, each hypothesis corresponding to a different set of at least one virtual antenna, and
means for selecting a hypothesis from among the multiple hypotheses, wherein the at least one selected virtual antenna is for the selected hypothesis.

24. The apparatus of claim 23, wherein the means for evaluating the multiple hypotheses comprises means for determining performance of each of the multiple hypotheses based on at least one metric, and wherein the means for selecting the hypothesis comprises means for selecting the hypothesis with best performance.

25. The apparatus of claim 22, further comprising:
means for sending channel state information for the at least one selected virtual antenna to a transmitter; and
means for receiving the data transmission from the transmitter via the at least one selected virtual antenna.

26. A non-transitory computer-readable medium including processor-executable code for storing instructions operable to:
select, by a processor, at least one virtual antenna from among multiple virtual antennas formed with multiple physical antennas, wherein each virtual antenna is mapped to some or all physical antennas by a different mapping;
determine an overall rate for each different set of at least one virtual antenna;
select at least one rate for the at least one selected virtual antenna based on signal quality for the at least one selected virtual antenna; and
use the at least one selected virtual antenna for data transmission.

27. An apparatus comprising:
at least one processor configured to receive channel state information for at least one virtual antenna selected from among multiple virtual antennas formed with multiple physical antennas, and to send data transmission via the at least one selected virtual antenna, wherein each virtual antenna is mapped to some or all physical antennas by a different mapping, wherein the at least one processor is also configured to determine an overall rate for each different set of at least one virtual antenna and to select at least one rate for the at least one selected virtual antenna based on the channel state information for the at least one selected virtual antenna; and
a memory coupled to the at least one processor.

28. The apparatus of claim 27, wherein the at least one processor is configured to distribute total transmit power uniformly across the at least one selected virtual antenna.

29. The apparatus of claim 27, wherein the at least one processor is configured to send the data transmission at the at least one selected rate.

30. The apparatus of claim 27, wherein the at least one processor is configured to send at least one data stream for the data transmission, and to map each of the at least one data streams to all of the at least one selected virtual antennas.

31. The apparatus of claim 30, wherein the at least one processor is configured to map each of the at least one data streams to all of the at least one selected virtual antennas based on a predetermined stream permutation.

32. The apparatus of claim 30, wherein the at least one processor is configured to map each of the at least one data streams to all of the at least one selected virtual antennas by cycling through the at least one selected virtual antenna across multiple subcarriers.

33. The apparatus of claim 27, wherein the at least one processor is configured to send at least one data stream for the data transmission, and to map each of the at least one data streams to a respective virtual antenna of the at least one selected virtual antennas.

34. The apparatus of claim 27, wherein the at least one processor is configured to receive the channel state information indicative of at least one matrix to use to form the at least one selected virtual antenna, and to process the data transmission with the at least one matrix.

35. The apparatus of claim 34, wherein the at least one processor is configured to send at least one data stream for the data transmission, and to map each data stream to all selected virtual antennas.

36. A method for wireless communications, wherein the method is performed by a network entity, the method comprising:
receiving channel state information for at least one virtual antenna selected from among multiple virtual antennas formed with multiple physical antennas, wherein each virtual antenna is mapped to some or all physical antennas by a different mapping;
determining an overall rate for each different set of at least one virtual antenna;
selecting at least one rate for the at least one selected virtual antenna based on the channel state information for the at least one selected virtual antenna; and
sending data transmission via the at least one selected virtual antenna.

37. The method of claim 36, further comprising:
distributing total transmit power across the at least one selected virtual antenna.

38. The method of claim 36, wherein the sending the data transmission comprises:
sending the data transmission at the at least one selected rate.

39. An apparatus comprising:
means for receiving channel state information for at least one virtual antenna selected from among multiple virtual antennas formed with multiple physical antennas, wherein each virtual antenna is mapped to some or all physical antennas by a different mapping;
means for determining an overall rate for each different set of at least one virtual antenna;
means for selecting at least one rate for the at least one selected virtual antenna based on the channel state information for the at least one selected virtual antenna; and
means for sending data transmission via the at least one selected virtual antenna.

40. The apparatus of claim 39, further comprising:
means for distributing total transmit power across the at least one selected virtual antenna.

41. The apparatus of claim 39, wherein the means for sending the data transmission comprises:
means for sending the data transmission at the at least one selected rate.

42. A non-transitory computer-readable medium including processor-executable code for storing instructions operable to:
receive channel state information, by a processor, for at least one virtual antenna selected from among multiple virtual antennas formed with multiple physical antennas, wherein each virtual antenna is mapped to some or all physical antennas by a different mapping;
determine an overall rate for each different set of at least one virtual antenna;
select at least one rate for the at least one selected virtual antenna based on the channel state information for the at least one selected virtual antenna; and
send data transmission via the at least one selected virtual antenna.

* * * * *